(12) United States Patent
Chen et al.

(10) Patent No.: US 11,172,391 B2
(45) Date of Patent: Nov. 9, 2021

(54) METHODS OF MULTIPLE SS BLOCK TRANSMISSIONS AND RRM MEASUREMENT IN A WIDEBAND CARRIER

(71) Applicant: MediaTek Singapore Pte. Ltd., Singapore (SG)

(72) Inventors: Tao Chen, Beijing (CN); Min Wu, Beijing (CN); Pei-Kai Liao, Hsinchu (TW)

(73) Assignee: MediaTek Singapore Pte. Ltd., Singapore (SG)

( * ) Notice: Subject to any disclaimer, the term of this patent is extended or adjusted under 35 U.S.C. 154(b) by 0 days.

(21) Appl. No.: 16/636,806

(22) PCT Filed: Aug. 9, 2018

(86) PCT No.: PCT/CN2018/099532
§ 371 (c)(1),
(2) Date: Feb. 5, 2020

(87) PCT Pub. No.: WO2019/029597
PCT Pub. Date: Feb. 14, 2019

(65) Prior Publication Data
US 2020/0374725 A1    Nov. 26, 2020

(30) Foreign Application Priority Data

Aug. 11, 2017  (WO) ................ PCT/CN2017/097148

(51) Int. Cl.
*H04W 24/10*      (2009.01)
*H04B 17/318*     (2015.01)
(Continued)

(52) U.S. Cl.
CPC .......... *H04W 24/10* (2013.01); *H04B 7/0617* (2013.01); *H04B 7/0626* (2013.01);
(Continued)

(58) Field of Classification Search
CPC .. H04W 24/10; H04W 56/001; H04B 17/318; H04B 7/0617; H04B 7/0626; H04L 5/0051; H04L 5/0092
See application file for complete search history.

(56) References Cited

U.S. PATENT DOCUMENTS

2013/0301434 A1   11/2013   Krishnamurthy et al.
2013/0301542 A1   11/2013   Krishnamurthy et al.
(Continued)

FOREIGN PATENT DOCUMENTS

CN          105493431 A      4/2016

OTHER PUBLICATIONS

Combined Chinese Office Action and Search Report dated Sep. 21, 2020 in Patent Application No. 201880005319.X (with English translation of Categories of Cited Documents), 8 pages.
(Continued)

*Primary Examiner* — Deepa Belur
(74) *Attorney, Agent, or Firm* — Oblon, McClelland, Maier & Neustadt, L.L.P.

(57) ABSTRACT

Aspects of the disclosure provide a method for radio resource management (RRM) measurement. The method can include receiving, by processing circuitry of a user equipment (UE), an RRM measurement configuration from a base station (BS) in a beamformed communication system. The RRM measurement configuration indicates presence of multiple quasi collocated (QCLed) frequency domain multiplexed (FDMed) reference signal (RS) transmissions in a carrier. The method can further includes perform RRM measurement according to the received RRM measurement configuration using one or more of the multiple QCLed FDMed RS transmissions.

21 Claims, 10 Drawing Sheets

(51) Int. Cl.
*H04B 7/06* (2006.01)
*H04L 5/00* (2006.01)
*H04W 56/00* (2009.01)

(52) U.S. Cl.
CPC ......... *H04B 17/318* (2015.01); *H04L 5/0051* (2013.01); *H04L 5/0092* (2013.01); *H04W 56/001* (2013.01)

(56) References Cited

U.S. PATENT DOCUMENTS

| | | |
|---|---|---|
| 2015/0055588 A1 | 2/2015 | Yerramalli et al. |
| 2015/0146674 A1 | 5/2015 | Krishnamurthy et al. |
| 2017/0078062 A1 | 3/2017 | Park et al. |
| 2018/0049080 A1* | 2/2018 | Zhang ............... H04W 36/0088 |
| 2018/0262313 A1* | 9/2018 | Nam ..................... H04L 5/0044 |
| 2018/0331727 A1* | 11/2018 | Wilson .................. H04L 5/0091 |
| 2019/0053235 A1* | 2/2019 | Novlan .................... H04L 5/001 |
| 2019/0132759 A1* | 5/2019 | Park .................... H04W 56/001 |
| 2020/0037385 A1* | 1/2020 | Park ....................... H04W 72/04 |
| 2020/0169340 A1* | 5/2020 | Hwang ................ H04W 48/16 |
| 2020/0196161 A1* | 6/2020 | Ahn ...................... H04W 80/08 |
| 2020/0374725 A1* | 11/2020 | Chen .................... H04B 7/0626 |

OTHER PUBLICATIONS

Combined Taiwanese Office Action and Search Report dated Feb. 14, 2020 in Patent Application No. 108120426 (with English translation of categories of cited documents), 19 pages.
International Search Report and Written Opinion dated Oct. 26, 2018 in PCT/CN2018/099532 filed on Aug. 9, 2018.

* cited by examiner

| CASES | SUBCARRIER SPACING (kHz) | FIRST SYMBOL INDEXES IN A HALF FRAME WINDOW | f<=3 GHz | 3 GHz<f<=6 GHz | 6 GHz <f |
|---|---|---|---|---|---|
| A | 15 | {2,8} + 14n | n = 0,1 | n = 0,1,2,3 | |
| B | 30 | {4,8,16,20}+28n | n = 0 | n = 0,1 | |
| C | 30 | {2,8} + 14n | n = 0,1 | n = 0,1,2,3 | |
| D | 120 | {4,8,16,20}+ 28n | | | n = 0, 1, 2, 3, 5, 6, 7, 8, 10, 11, 12, 13, 15, 16, 17, 18 |
| E | 240 | {8, 12, 16, 20, 32, 36, 40, 44} + 56n | | | n = 0, 1, 2, 3, 5, 6, 7, 8, |

METHODS OF MULTIPLE SS BLOCK TRANSMISSIONS AND RRM MEASUREMENT IN A WIDEBAND CARRIER

INCORPORATION BY REFERENCE

This present disclosure claims the benefit of International Application No. PCT/CN2017/097148, "Methods of Multiple SS Block Transmissions and RRM Measurement in a Wideband Carrier" filed on Aug. 11, 2017, which is incorporated herein by reference in its entirety.

TECHNICAL FIELD

The present disclosure relates to wireless communications, and specifically relates to radio resource management (RRM) measurement in a wireless system.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

New Radio (NR) air interface of 5th generation (5G) wireless communication systems supports much wider channel bandwidth (CBW) (e.g., 400 MHz) compared to that of Long-Term Evolution standards (e.g., 20 MHz). The wide CBW enables more efficient use of resources than existing carrier aggregation (CA) mechanisms.

In a wireless communication system, radio resource management (RRM) measurement provides measurement results to support a wide range of operations including channel dependent scheduling, power control, idle and connected mode mobility, and the like. For example, RRM measurements defined in some communication standards can include reference signal received power (RSRP), reference signal received quality (RSRQ), and received signal strength indicator (RSSI).

SUMMARY

Aspects of the disclosure provide a method for radio resource management (RRM) measurement. The method can include receiving, by processing circuitry of a user equipment (UE), an RRM measurement configuration from a base station (BS) in a beamformed communication system. The RRM measurement configuration indicates presence of multiple quasi collocated (QCLed) frequency domain multiplexed (FDMed) reference signal (RS) transmissions in a carrier. The method can further includes perform RRM measurement according to the received RRM measurement configuration using any one or more of the multiple QCLed FDMed RS transmissions.

In an embodiment, RSs of the multiple QCLed FDMed RS transmissions include synchronization signals (SSs) of SS blocks, channel state information reference signals (CSI-RSs), or a combination of SSs of SS blocks and CSI-RSs.

An embodiment of the method further includes performing reference signal received power (RSRP) measurement using more than one of the multiple QCLed FDMed RS transmissions, wherein received power on resource elements (REs) corresponding to the more than one of the QCLed FDMed RS transmissions is averaged to obtain an RSRP measurement.

An embodiment of the method further includes operating on a bandwidth part (BWP) including a subset of the multiple QCLed FDMed RS transmissions, and performing RSRP measurement using one or more of the subset of the multiple QCLed FDMed RS transmissions.

An embodiment of the method further includes operating on a BWP of the carrier without the multiple QCLed FDMed RS transmissions, and switching to a BWP including a subset of the multiple QCLed FDMed RS transmissions to perform inter-frequency RSRP measurement using the subset of the multiple QCLed FDMed RS transmissions.

An embodiment of the method further includes operating on a BWP of the carrier containing a subset of the multiple QCLed FDMed RS transmissions, performing RSRP measurement on the BWP using the subset of the multiple QCLed FDMed RS transmissions to obtain an RSRP measurement result, performing received signal strength indicator (RSSI) measurement on a measurement bandwidth indicated by the RRM measurement configuration that is different from the BWP to obtain an RSSI measurement result, and calculating a reference signal received quality (RSRQ) using the RSRP measurement result and the RSSI measurement result. In one example, the measurement bandwidth indicated by the RRM measurement configuration for the RSSI measurement overlaps or does not overlap the BWP.

An embodiment of the method further includes operating on a BWP of the carrier without the multiple QCLed FDMed RS transmissions, performing inter-frequency RSRP measurement on a first measurement bandwidth using a subset of the multiple QCLed FDMed RS transmissions to obtain an RSRP measurement, performing inter-frequency RSSI measurement on a second measurement bandwidth that is different from the first measurement bandwidth to obtain an RSSI measurement, and calculating an RSRQ measurement based on the RSRP measurement and the RSSI measurement.

An embodiment of the method further includes performing inter-frequency RSRP measurement on a first measurement bandwidth using a subset of the multiple QCLed FDMed RS transmissions to obtain an RSRP measurement based on a first measurement gap configuration indicated by the RRM measurement configuration, performing inter-frequency RSSI measurement on a second measurement bandwidth that is different from the first measurement bandwidth to obtain an RSSI measurement based on a second measurement gap configuration indicated by the RRM measurement configuration that is independent from the first measurement gap configuration, and calculating an RSRQ measurement based on the RSRP measurement and the RSSI measurement.

An embodiment of the method further includes performing RSRP measurement on a first measurement bandwidth using a subset of the multiple QCLed FDMed RS transmissions to obtain an RSRP measurement, performing RSSI measurement on a second measurement bandwidth that is different from the first measurement bandwidth, and on time domain measurement resources indicated by the RRM measurement configuration to obtain an RSSI measurement, wherein the time domain measurement resources includes orthogonal frequency division multiplexing (OFDM) symbols that carry or does not carry RSs of the multiple QCLed FDMed RS transmissions, and calculating an RSRQ measurement based on the RSRP measurement and the RSSI measurement.

An embodiment of the method further includes operating on a first BWP of the carrier, performing a radio frequency (RF) tuning during a first measurement gap to cover a second BWP overlapping the first BWP and a measurement bandwidth, performing RRM measurement on the measurement bandwidth while performing data reception on the first BWP, and performing an RF tuning during a second measurement gap to switch back to the first BWP. In one example, the RRM measurement on the measurement bandwidth includes RSRP and/or RSSI measurement.

Aspects of the disclosure provide a second method for RRM measurement. The second method can include transmitting, by processing circuitry of a base station, an RRM measurement configuration to a UE in a beamformed communication system. The RRM measurement configuration indicates presence of multiple quasi collocated (QCLed) frequency domain multiplexed (FDMed) reference signal (RS) transmissions in a carrier. The second method further includes receiving measurement results obtained according to the RRM measurement configuration from the UE.

In one example, RSs of the multiple QCLed FDMed RS transmissions include synchronization signals (SSs) of SS blocks, channel state information reference signals (CSI-RSs), or a combination of SSs of SS blocks and CSI-RSs.

In one example, the RRM measurement configuration indicates frequency locations and periods of the multiple QCLed FDMed RS transmissions.

In one example, the second method includes transmitting a bandwidth part (BWP) configuration to the UE indicating an active BWP including at least one of the multiple QCLed FDMed RS transmissions, and transmitting the RRM measurement configuration indicating a measurement bandwidth for received signal strength indicator (RSSI) measurement that is different from the active BWP configured to the UE.

In one example, the second method includes transmitting a BWP configuration to the UE indicating an active BWP without the multiple QCLed FDMed RS transmissions, and transmitting the RRM measurement configuration indicating a first measurement bandwidth and a first measurement gap configuration for reference signal received power (RSRP) measurement on the first measurement bandwidth that includes a subset of the multiple QCLed FDMed RS transmissions, and a second measurement bandwidth and second measurement gap configuration for RSSI measurement on the second measurement bandwidth. The second measurement bandwidth is different from the first measurement bandwidth, and the second measurement configuration is independent from the first measurement configuration.

In one example, the second method further includes transmitting the RRM measurement configuration that indicates a first measurement bandwidth for RSRP measurement including a subset of the multiple QCLed FDMed RS transmissions, a second measurement bandwidth for RSRQ measurement that is different from the first measurement bandwidth, and time domain resources for the RSSI measurement including a set of OFDM symbols that carries or does not carry RSs of the multiple QCLed FDMed RS transmissions.

In one example, the second method further includes transmitting a BWP configuration indicating an active BWP to the UE, transmitting the RRM measurement configuration indicating a measurement gap configuration specifying a first measurement gap and a second measurement gap at a beginning and an end, respectively, of a measurement occasion, and a repetition period of the measurement occasion, and transmitting data during an interval between the first and second measurement gaps on the active BWP.

Aspects of the disclosure further provide a UE. The UE can include processing circuitry configured to receive a radio resource management (RRM) measurement configuration from a base station (BS) in a beamformed communication system. The RRM measurement configuration indicates presence of multiple quasi collocated (QCLed) frequency domain multiplexed (FDMed) reference signal (RS) transmissions in a carrier. The processing circuitry can further be configured to perform RRM measurement according to the received RRM measurement configuration using any one or more of the multiple QCLed FDMed RS transmissions.

BRIEF DESCRIPTION OF DRAWINGS

Various embodiments of this disclosure that are proposed as examples will be described in detail with reference to the following figures, wherein like numerals reference like elements, and wherein.

DETAILED DESCRIPTION

Figure 1:
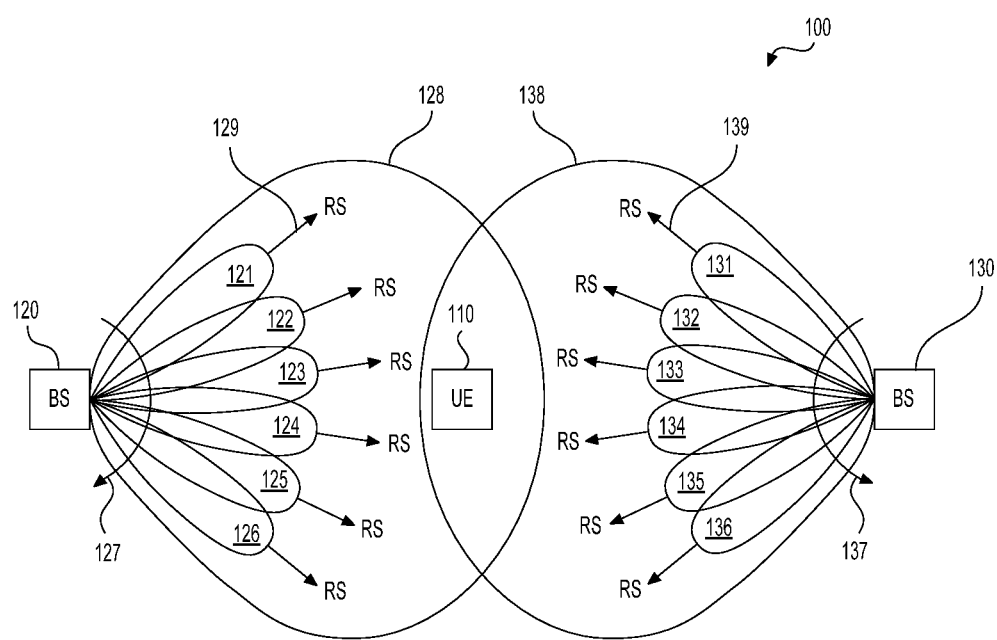
FIG. 1 shows a beam-based wireless communication system according to an embodiment of the disclosure.

FIG. 1 shows a beam-based wireless communication system 100 according to an embodiment of the disclosure. The system 100 can include a user equipment (UE) 110, a first base station (BS) 120, and a second BS 130. The system 100 can employ the 5th generation (5G) technologies developed by the 3rd Generation Partnership Project (3GPP). For example, millimeter Wave (mm-Wave) frequency bands and beamforming technologies can be employed in the system 100. Accordingly, the UE 110, the BSs 120-130 can perform beamformed transmission or reception. In beamformed transmission, wireless signal energy can be focused on a specific direction to cover a target serving region. As a result, an increased antenna transmission (Tx) gain can be achieved in contrast to omnidirectional antenna transmission. Similarly, in beamformed reception, wireless signal energy received from a specific direction can be combined to obtain a higher antenna reception (Rx) gain in contrast to omnidirectional antenna reception. The increased Tx or Rx gain can compensate path loss or penetration loss in mm-Wave signal transmission.

The BS 120 or 130 can be a base station implementing a gNB node as specified in 5G New Radio (NR) air interface standards developed by 3GPP. The BS 120 or 130 can be configured to control one or more antenna arrays to form directional Tx or Rx beams for transmitting or receiving wireless signals. In some examples, different sets of antenna arrays are distributed at different locations to cover different serving areas. Each such set of antenna arrays can be referred to as a transmission reception point (TRP).

In FIG. 1 example, the BS 120 can control a TRP to form Tx beams 121-126 to cover a cell 128. The beams 121-126 can be generated towards different directions. The beams 121-126 can be generated simultaneously or in different time intervals in different examples. In one example, the BS 120 is configured to perform a beam sweeping 127 to transmit L1/L2 control channel and/or data channel signals. During the beam sweeping 127, Tx beams 121-126 towards different directions can be successively formed in a time division multiplex (TDM) manner to cover the cell 128. During each time interval for transmission of one of the beams 121-126, a set of L1/L2 control channel data and/or data channel data can be transmitted. The beam sweeping 127 can be performed repeatedly with a certain periodicity. In alternative examples, the beams 121-126 may be generated in a way other than performing a beam sweeping. For example, multiple beams towards different directions may be generated at a same time. In other examples, different from FIG. 1 examples where the beams 121-126 are generated horizontally, the BS 120 can generate beams towards different horizontal or vertical directions. In an example, the maximum number of beams generated from a TRP can be 64.

Each beam 121-126 can be associated with various reference signals (RSs) 129, such as channel-state information reference signal (CSI-RS), demodulation reference signal (DMRS), or synchronization signals (SSs) (e.g., primary synchronization signal (PSS), and secondary synchronization signal (SSS)). Those RSs can serve for different purposes depending on related configurations and different scenarios. For example, some RSs can be used for radio resource management (RRM) measurement. Each beam 121-126, when transmitted at different occasions, may carry different signals, such as different L1/L2 data or control channels, or different RSs.

The BS 130 can operate in a way similar to the BS 120. For example, the BS 130 can control a TRP to transmit Tx beams 131-136 to cover a cell 138. The BS 130 may transmit the beams 131-136 in a beam sweeping manner, or may form a subset of the beams 131-136 simultaneously at different time instances. Similarly, each of the beams 131-136 may carry various RSs 139.

The UE 110 can be a mobile phone, a laptop computer, a vehicle carried mobile communication device, a utility meter, and the like. Similarly, the UE 110 can employ one or more antenna arrays to generate directional Tx or Rx beams for transmitting or receiving wireless signals. In FIG. 1 example, the UE 110 is within the coverage of the cells 128 and 138, however, is connected to the BS 120 and served by the cell 128. Accordingly, the cell 128 is referred to as a serving cell of the UE 110 while the cell 138 is referred to as a neighbor cell of the UE 110. While only one UE 110 is shown in FIG. 1, a plurality of UEs can be distributed within the cells 128 and/or 138, and served by the BS 120 or 130, or other BSs not shown in FIG. 1.

In one example, the beams 121-126 of the cell 128 can be identified using synchronization signal blocks (SS blocks) (also referred to as SS/PBCH blocks). For example, an SS block can include SSs (e.g., PSS, SSS) and a physical broadcast channel (PBCH) carried on several consecutive symbols in an orthogonal frequency division multiplexing (OFDM) based system. For example, the BS 120 may periodically perform a beam sweeping to transmit a sequence of SS blocks with each beam corresponding to each SS block. The sequence of SS blocks may each carry an SS block index indicating a timing or location of each SS block among the sequence of SS blocks. Thus, each of the beams 121-126 can be associated with (or corresponding to) such an SS block index.

In one example, the UE 110 performs radio resource management (RRM) measurement and report measurement results to its serving cell 128. The measurement results are useful to support a wide range of operations including channel dependent scheduling, power control, idle and connected mode mobility, beam management, beam tracking, bandwidth part switching, and the like. For example, RRM measurements as defined in 3GPP standards can include reference signal received power (RSRP), reference signal received quality (RSRQ), and received signal strength indicator (RSSI), signal-to-noise and interference ratio (SINR).

For example, RSRP can be measured by the UE 110 over cell-specific RSs (e.g., SS or CSI-RS) within a measurement bandwidth over a measurement period. RSRP reflects a signal strength of received signals, and is useful for indicative of a cell coverage. RSRP can be defined as a linear average over power contributions of resource elements (REs) that carry the cell-specific RSs with a measurement bandwidth over a measurement period.

For example, RSRQ is a ratio of RSRP to RSSI corresponding to a specific downlink carrier. For example, RSRQ is defined as a ratio of NxRSRP/carrier RSSI, where N is a number of resource blocks in a carrier RSSI measurement bandwidth. RSSI is total power from all sources, including serving and non-serving cells, adjacent channel interference, and thermal noise, observed in certain OFDM symbols of measurement time resources in a measurement bandwidth (including the N resource blocks), linearly averaged over the respective OFDM symbols.

In different scenarios, RRM measurement can be performed with different reference signals, such as SSs and/or DMRS carried in SS blocks, CSI-RSs configured for RRM measurement, and the like. In some examples, SS based RRM measurement can be performed when the UE 110 is in radio resource control (RRC) connected mode, RRC inactive mode, or RRC idle mode. CSI-RS based RRM measurement can be performed when the UE 110 is in RRC connected mode.

In one example, RSRP and/or RSRQ measurement results are used for cell reselection when the UE 110 is in RRC idle mode, and handover when the UE 110 is in RRC connected mode. For example, when in RRC connected state, the UE 110 may report the RRM measurement results to the serving cell 128. When in RRC idle state, the UE 110 does not report the RRM measurement results, and may use the RRM measurement results autonomously for cell reselection.

In some examples, the UE 110 may have a plurality of neighbor cells, such as 2, 3 or 10 neighbor cells. Accordingly, the UE 110 may perform RRM measurement on multiple neighbor cells in addition to the serving cell 128. For example, a list of to-be-measured neighbor cells can be configured by the BS 120 to the UE 110. Or, the UE 110 can measure neighbor cells detected by the UE 110.

In addition, the UE 110 may perform RRM measurement in an intra-frequency manner or an inter-frequency manner. For example, when performing intra-frequency measurement, the UE 110 measures RSs received within a bandwidth of a carrier the serving cell 128 operates on. The RSs can be transmitted from either the serving cell 128 or neighbor cells. When performing inter-frequency measurement, the UE 110 leaves the carrier the serving cell 128 operates on, and switches to a different carrier to receive RSs transmitted either from the serving cell 128 or neighbor cells. For the purpose of inter-frequency measurement, a measurement gap may be configured. In one example, in time domain, physical layer measurement periods for RSRP measurement are defined as 200 ms and 480 ms for intra-frequency and inter-frequency RSRP, respectively.

In one example, RSRP is performed for indicating signal qualities at beam level, and a cell level signal quality can be derived based on beam level measurement results. For example, RSRP corresponding to each of the beams 121-126 can be measured at the UE 110 based on the RSs (e.g., SS or CSI-RS) associated with each beam. For example, the resulting beam level RSRP can be associated with a beam index and used for beam tracking or beam management purpose. In order to evaluate a signal quality of a cell, for example, for a handover operation, a subset of the beam level RSRP measurement results can be employed. In one example, a number of beam level RSRPs having a value above a threshold, or a number of the beam level RSRPs with highest values, can be averaged to derive a cell level RSRP to reflect a quality of a cell.

In one example, the BS 120 configures the UE 110 to perform RRM measurement and report respective measurement results in accordance with a measurement configuration. The measurement configuration is provided by means of dedicated signaling (e.g., RRC messages) or broadcasting signaling. For example, the measurement configuration may include a group of parameters, such as measurement objects, reporting configurations, measurement identities, quantity configurations, measurement gaps, and the like. For example, the measurement objects parameters may specify a list of objects on which the UE 110 shall perform the measurements. For example, for intra-frequency and inter-frequency measurements, a measurement object indicates frequency/time location and subcarrier spacing of RSs to be measured. Associated with this measurement object, a list of cells and a list of cell specific offsets may be specified. The UE 110 measures and reports on the serving cell(s), listed cells, and/or detected cells.

Figure 2:
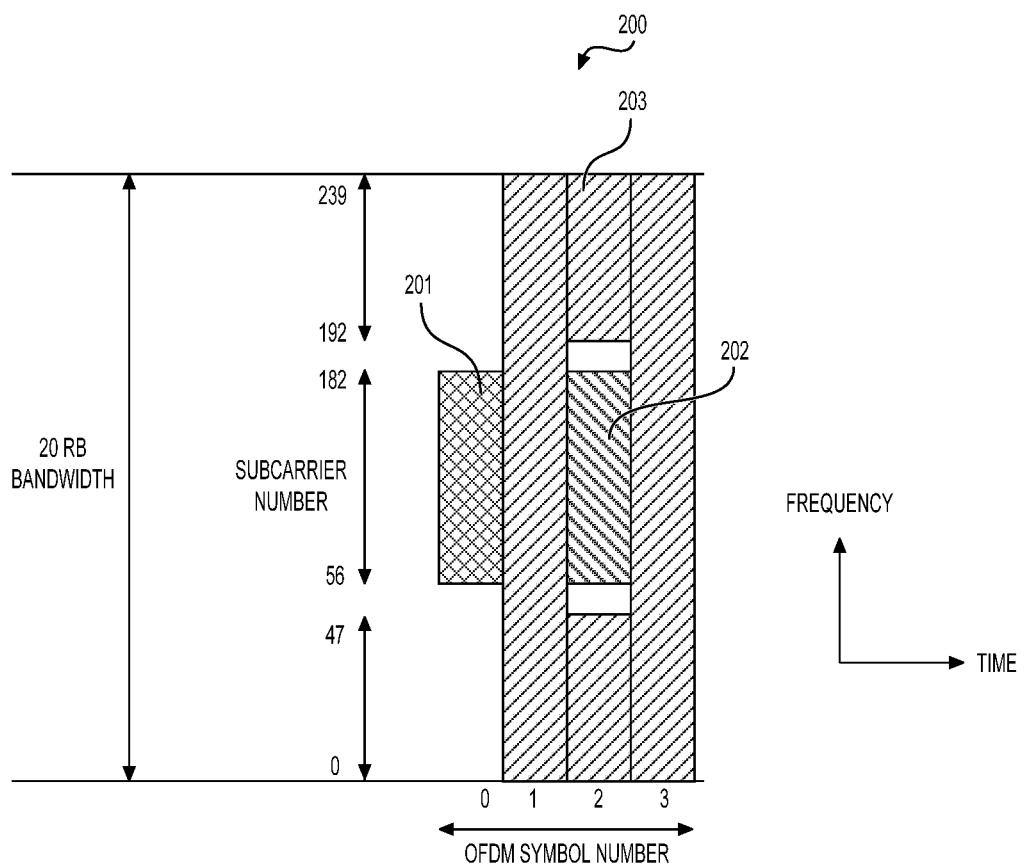
FIG. 2 shows an example of a synchronization signal (SS) block according to an embodiment of the disclosure.

FIG. 2 shows an example of an SS block 200 used in the system 100 according to an embodiment of the disclosure. The SS block 200 can include a PSS 201, an SSS 202, and a PBCH 203 (represented with shaded areas designated with numbers of 201, 202, and 203). Those signals can be carried in REs on a time-frequency resource grid as shown in FIG. 2. In addition, the SS block 200 can carry DMRSs (not shown) in a subset of REs in the shaded area 203. The REs carrying DMRSs are not used for carrying PBCH signals in one example.

In one example, the SS block 200 can be distributed over 4 OFDM symbols in time domain and occupy a 20 resource block (RB) bandwidth in frequency domain. As shown in FIG. 2, the 4 OFDM symbols are numbered from 0 to 4, while the 20 RB bandwidth includes 240 subcarriers numbered from 0 to 239. Specifically, the PSS 201 can occupy REs at symbol 0 and subcarriers 56-182. The SSS 202 can occupy REs at symbol 2 and subcarriers 56-182. The PBCH 203 can be located at symbols 1-3 occupying 20 RBs at symbols 1 and 3, and 8 RBs (96 subcarriers) at symbol 2.

In one example, the SS block 200 is configured to carry bits of an SS block index by using the DMRSs and the PBCH 203. In one example, by decoding the PSS 201 and the SSS 202, a physical layer cell identification (ID) can be determined. The cell ID indicates which cell the SS block 200 is associated with.

In some examples, RSRP is measured using SS blocks. Such measurements are referred to as SS-RSRP. For example, SS-RSRP is defined as a linear average over power contributions of REs that carry SSSs. In some examples, the DMRS for the PBCH 203 and CSI-RS in addition to the SSSs may be used for RSRP measurement. In some examples, a beam level RSRP is measured using RSs (e.g., SSS, DMRS, CSI-RS) corresponding to SS blocks with a same SS block index, and a same physical layer cell ID. The SS blocks can be periodically transmitted during a measurement time window.

Figure 3:
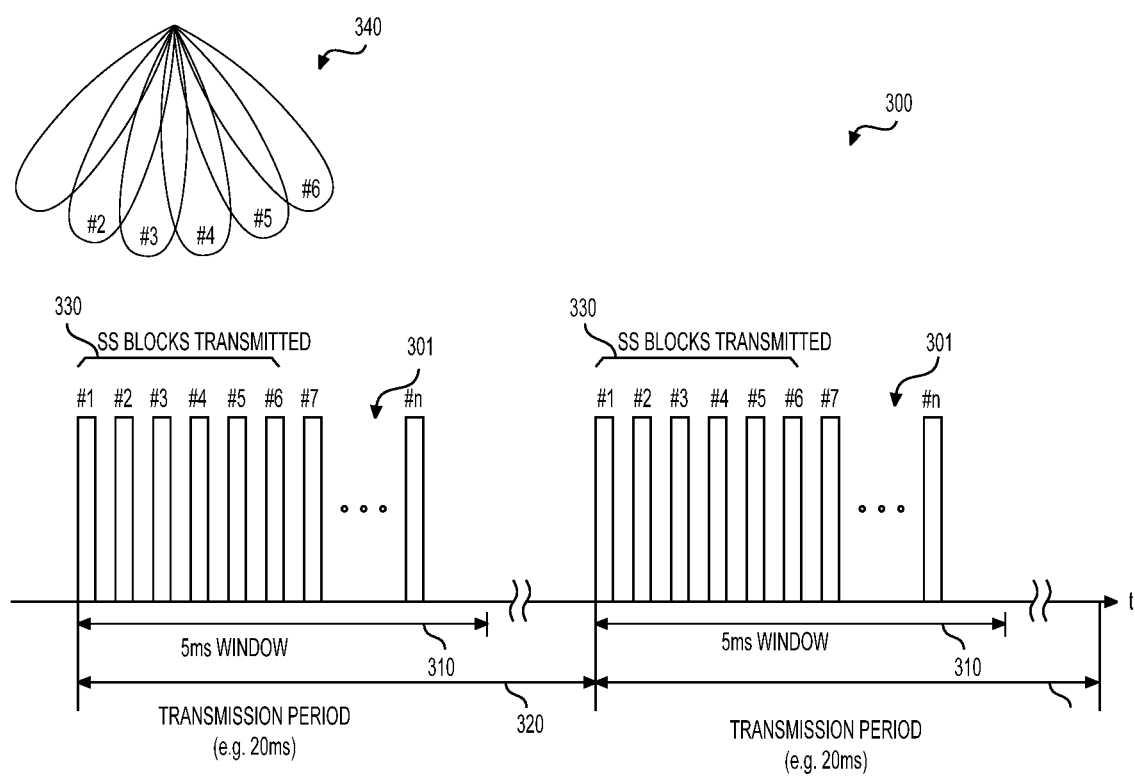
FIG. 3 shows an example SS block transmission configuration according to an embodiment of the disclosure.

FIG. 3 shows an example SS block transmission configuration 300 according to an embodiment of the disclosure. According to the configuration 300, a sequence 301 of SS blocks, referred to as SS block burst set 301, can be transmitted with a periodicity 320 (e.g., 20 ms) in a sequence of radio frames. The SS block set 301 can be confined within a half frame transmission window 310 (e.g., 5 ms). Each configured SS block can have an SS block index (e.g., from #1 to #n). The SS blocks of the SS block set 301 are configured as candidate SS blocks, but may not be used for actual transmissions of SS blocks.

For example, a cell 340 employs 6 beams from #1 to #6 to cover a serving area and transmits SS blocks based on the configuration 300. Accordingly, only a subset 330 of the SS block set 301 is transmitted. For example, the transmitted SS blocks 330 may include the first six candidate SS blocks of the SS block set 301 each corresponding to one of the beams #1-#6. Resources corresponding to other candidate SS blocks from #7 to #n can be used for transmission of data other than SS blocks.

Figure 4:
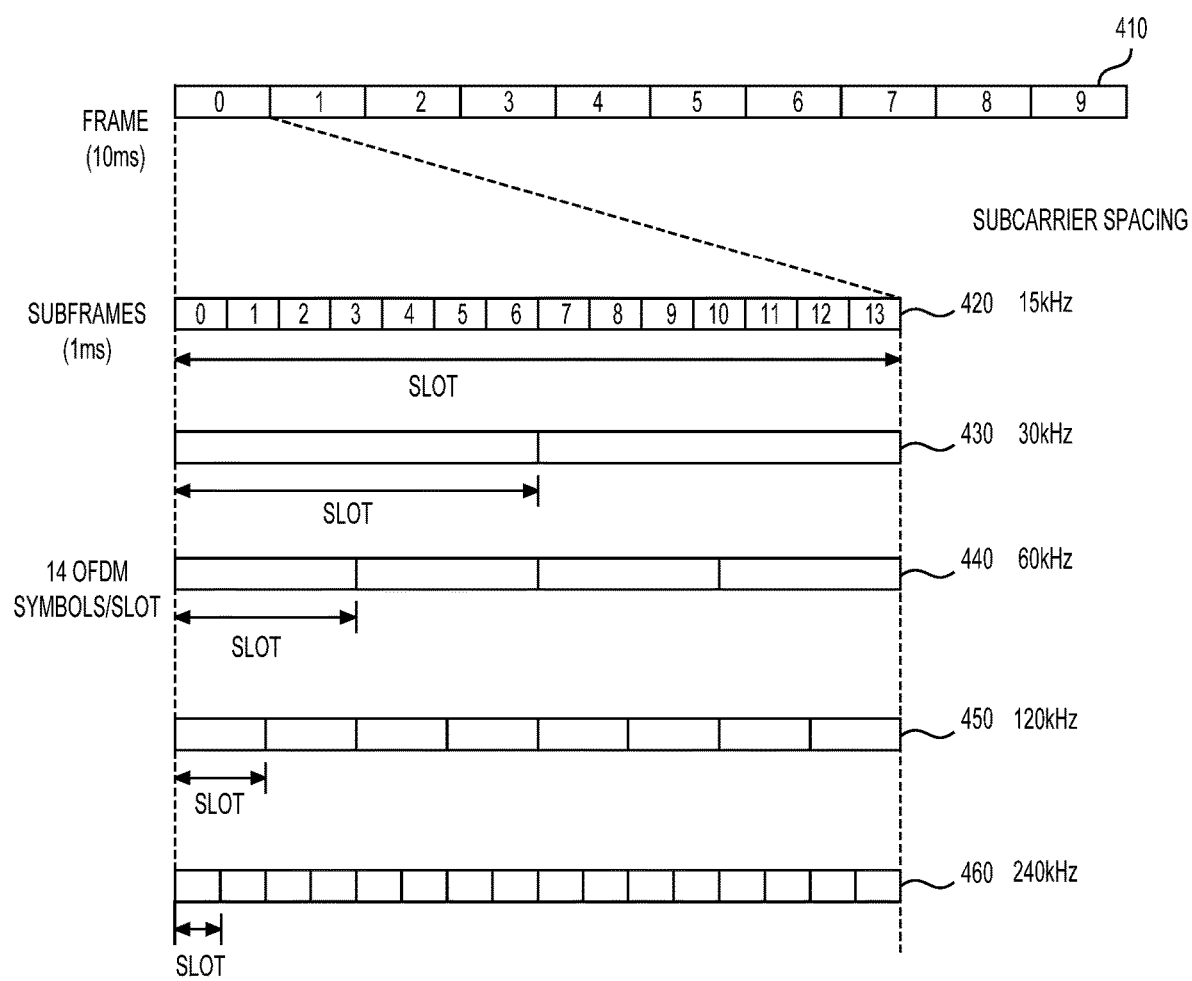
FIG. 4 shows example frame structures corresponding to different subcarrier spacings according to an embodiment of the disclosure.

FIG. 4 shows example frame structures used in the system 100 corresponding to different subcarrier spacings according to an embodiment of the disclosure. A radio frame 410 can last for 10 ms and include 10 subframes that each last for 1 ms. Corresponding to different numerologies and respective subcarrier spacings, a subframe may include different number of slots. For example, for a subcarrier spacing of 15 kHz, 30 kHz, 60 kHz, 120 kHz, or 240 kHz, a respective subframe 420-460 can include 1, 2, 4, 8, or 16 slots, respectively. Each slot may include 14 OFDM symbols in one example.

Figures 5, 6:
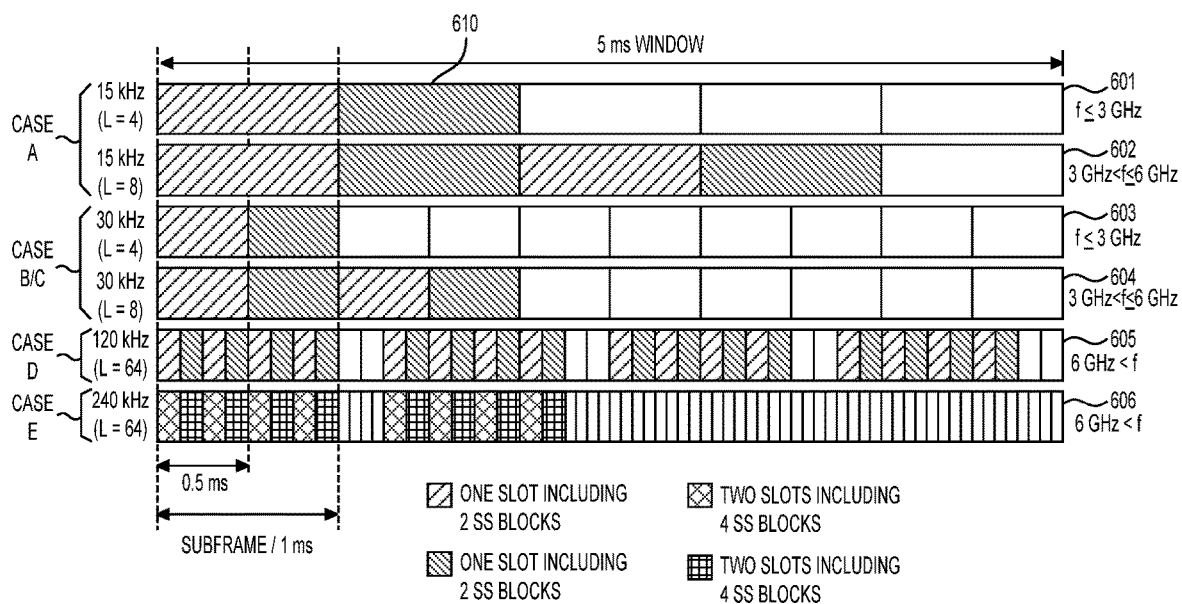
FIG. 5 shows a table including example SS block configurations according to an embodiment of the disclosure.
FIGS. 6-8 illustrate SS block configurations of cases A-E in FIG. 5.

FIG. 5 shows a table 500 including example SS block configurations within a 5 ms half frame time window according to an embodiment of the disclosure. The table 500 shows five cases A-E of SS block configurations in five rows of the table 500. The five cases A-E correspond to different subcarrier spacing configurations of a cell. For each case, indexes of first symbols in each SS block within a half frame (e.g., 5 ms) are specified.

For example, in case A with 15 kHz subcarrier spacing, the first symbols of the candidate SS blocks have symbol indexes of {2, 8}+14n. For carrier frequencies smaller than or equal to 3 GHz, n=0, 1, corresponding to a total number of L=4 SS blocks. Accordingly, the 4 candidate SS blocks can have SS block indexes in an ascending order in time from 0 to 4. For carrier frequencies larger than 3 GHz and smaller than or equal to 6 GHz, n=0, 1, 2, 3, corresponding to a total number of L=8 candidate SS blocks. Accordingly, the 8 candidate SS blocks can have SS block indexes in an ascending order in time from 0 to 8.

For another example, in case D with 120 kHz subcarrier spacing, the first symbols of the candidate SS blocks have symbol indexes of {4, 8, 16, 20}+28n. For carrier frequencies larger than 6 GHz, n=0, 1, 2, 3, 5, 6, 7, 8, 10, 11, 12, 13, 15, 16, 17, 18, corresponding to a total number of L=64 candidate SS blocks. Accordingly, the 64 candidate SS blocks can have SS block indexes in an ascending order in time from 0 to 64.

Figure 7:
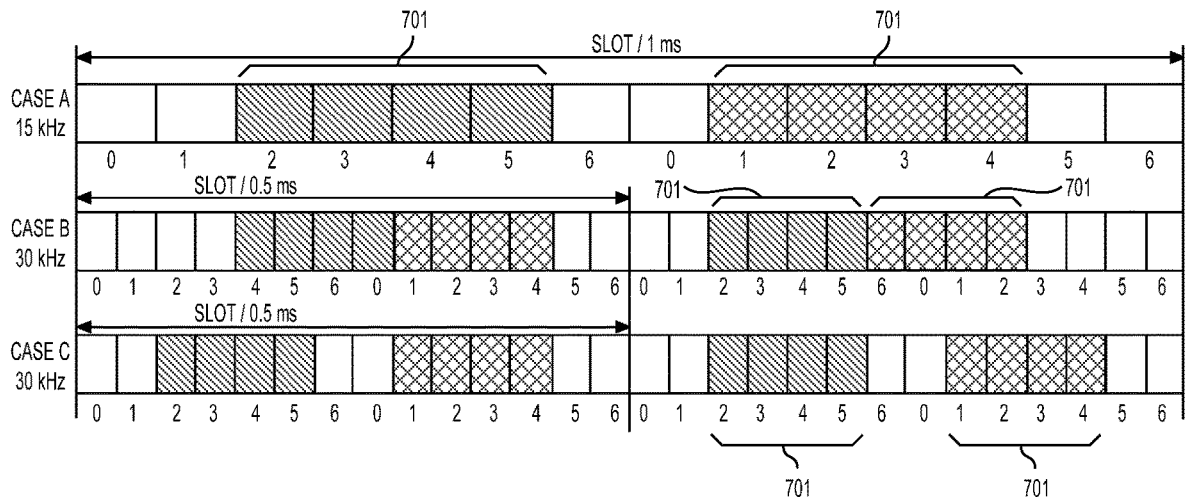
Figure 8:
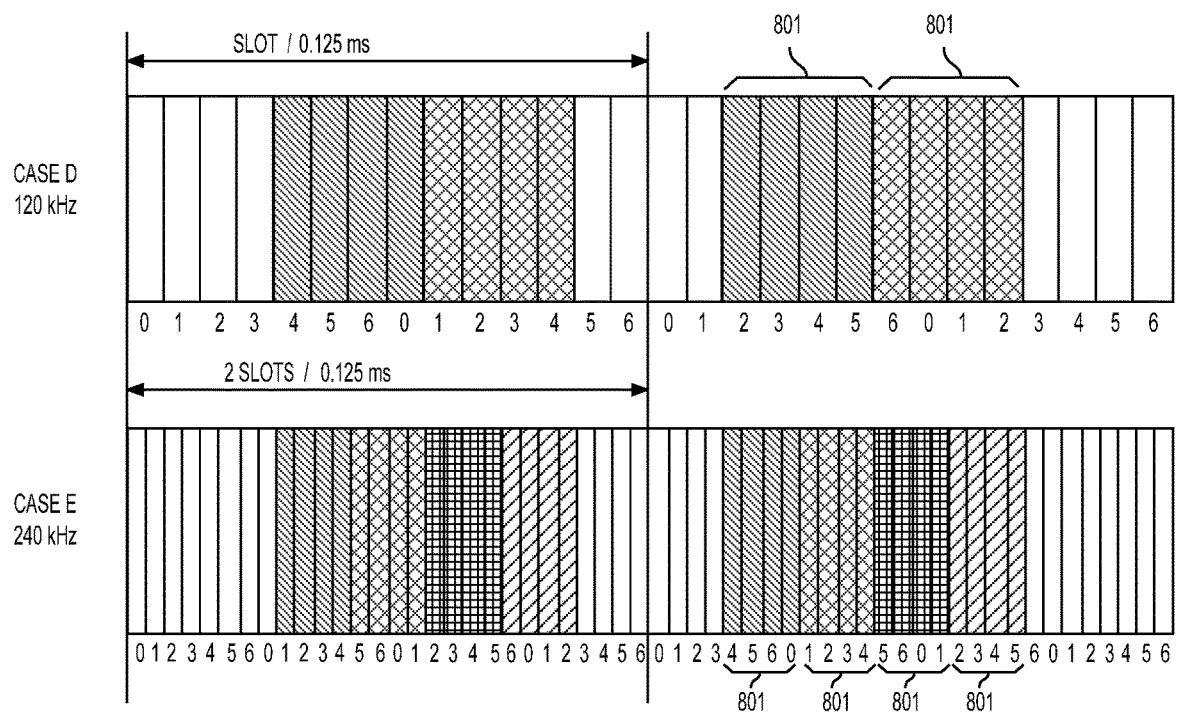

FIGS. 6-8 illustrate the SS block configurations of cases A-E in FIG. 5. Specifically, FIG. 6 shows six SS block configurations 601-606 corresponding to different combinations of subcarrier spacings and frequency bands. In each configuration 601-606, slots containing SS blocks within a half frame window are shown with shaded rectangles 610. FIGS. 7 and 8 show zoomed-in views of how SS blocks 701 or 801 are distributed over sequences of symbols in time domain.

Figure 9:
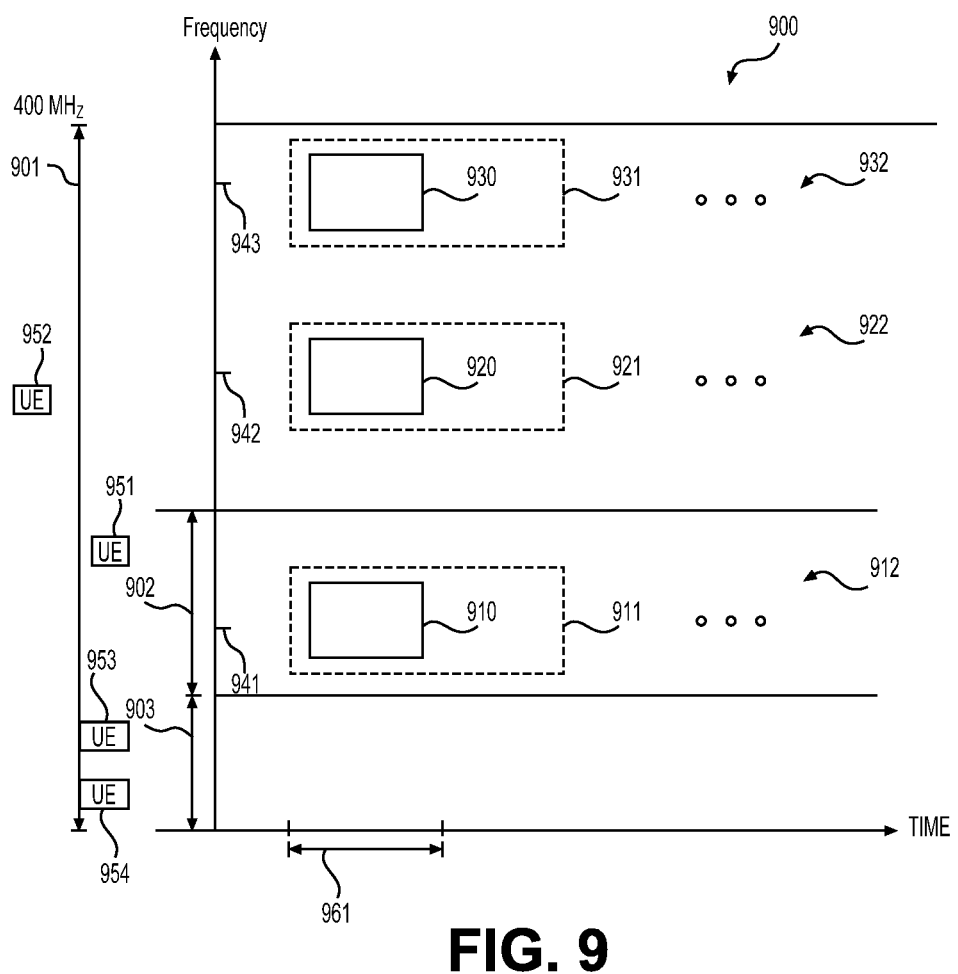
FIG. 9 shows an example configuration of multiple SS block transmissions in a wideband carrier according to embodiments of the disclosure.

FIG. 9 shows an example configuration 900 of multiple SS block transmissions in a wideband carrier according to embodiments of the disclosure. In one example, the BS 120 is configured to operate on a wideband carrier 901 having a much wider channel bandwidth (e.g., up to 400 MHz, or more than 400 MHz) compared with a Long Term Evolution (LTE) system that typically has a maximum component carrier (CC) bandwidth of 20 MHz. Compared with carrier aggregation (CA) scheme in an LTE system, operating on a wider channel bandwidth has advantages of more efficient and flexible resource scheduling, lower control overhead, and higher speed of activating or deactivating a portion of the wideband carrier (e.g., bandwidth part switching).

In addition, the BS 120 is configured to support intra-band CA to support coexistence of UEs having different RF capabilities. For example, a wideband UE is capable of covering the whole bandwidth of the wideband carrier 901 with one radio frequency (RF) chain, and accordingly can be configured with the entirety of the wideband carrier 901. A narrowband UE having a single RF chain can cover a portion of the wideband carrier 901, and can be configured with an intra-band CC. A CA UE that has multiple RF chains and is capable of intra-band CA can be configured with a set of intra-band CC with CA.

Further, the BS 120 is configured to support bandwidth part (BWP) operations to achieve power savings. According to the disclosure, a BWP can be defined as a group of contiguous physical resource blocks (PRBs). A bandwidth of the BWP can be at least as large as one SS block bandwidth, but the BWP may or may not contain SS blocks. Multiple BWPs may be configured to a UE, for example, by RRC signaling. The multiple BWPs may overlap with each other. The UE may operate on an active BWP which is one of the multiple BWPs at a given time, and switch to another BWP when needed. For example, the UE can access to a default BWPduring an initial access process, and switch to one of the multiple configured BWPsafter RRC connection establishment. For example, a wideband UE can operate in a narrowband mode with a low data rate on a BWP having a narrower bandwidth than the wideband carrier 901, and switch to a wider BWP to facilitate a higher data rate.

As shown, multiple frequency domain multiplexed (FDMed) SS blocks 910-930 are transmitted within the wideband carrier 901. The multiple FDMed SS blocks 910-930 can be distributed at different frequency locations 941-943. Providing multiple FDMed SS blocks may have multiple advantages. For example, there can be more flexibility for configuring UEs to operate on BWPs at different frequency locations where an SS blocks are available for various operations. In scenarios where a UE searches for an SS block during an initial access process, multiple available SS blocks can expedite the initial access process. For a CA UE having multiple RF chains, multiple SS blocks at different frequency locations provide means for synchronizations at different intra-band CC for each of the multiple RF chains.

The multiple FDMed SS blocks 910-930 can belong to different SS block burst sets 911-931 that are each transmitted periodically. Accordingly, each of the multiple FDMed SS blocks 910-930 can be transmitted periodically forming multiple transmissions 912, 922, and 932 of FDMed SS blocks. For example, each transmission 912, 922, or 932 may correspond to a sequence of SS blocks 910, 920, or 930.

The SS block burst sets 911-931 may have different SS block transmission configurations. For example, each of the SS block burst sets 911-913 may have different periodicity. For example, a bandwidth part 902 including the SS block burst set 911 is used as a default bandwidth part for initial access. Accordingly, the SS block burst set 911 including the SS block 910 may be configured with a shorter period than other SS block burst sets 921-931 such that a beam sweeping operation may be performed more rapidly during the initial access. Accordingly, each of the multiple FDMed SS blocks 910-930 may be transmitted periodically with different periodicities. Different from what is shown in FIG. 9 where the SS blocks 910-930 are present at a same time instance, later transmitted FDMed SS blocks 910-930 at different frequency locations 941-943 may not by synchronized.

In one example, the multiple FDMed SS blocks 910-930 are configured to be equivalent for RRM measurement. For example, the SS blocks 910-930 can be transmitted from a same antenna port with a same beam, and a same power level. In addition, channel characteristics are consistent at different frequency locations within the wideband carrier 901. Under such configuration and channel condition, SS block based or SS based RRM measurement (e.g., RSRP) performed at one frequency location using a respective SS block can reflect the channel condition of the whole wideband carrier 901. Accordingly, the SS block based RRM measurement can be performed with any one of the multiple FDMed SS blocks 910-930, and corresponding RRM measurement results would be equivalent irrespective which one of the multiple FDMed SS blocks 910-930 is used. The multiple FDMed SS blocks 910-930 configured to be equivalent for RRM measurement are said to be quasi collocated (QCLed) for RRM measurement.

Under the configuration of QCLed multiple FDMed SS blocks 910-930, RRM measurement (e.g., RSRP) can be performed in different ways depending on UE RF capability, wideband or narrowband operating mode, and active BWP configuration.

In a first example, a first UE 951, which is a narrowband UE or a wideband UE operating in narrowband mode, operates on the BWP 902. The UE 951 can perform RSRP measurement using the transmission 912 of the SS blocks 910. For example, five measurements may be repeatedly performed using five SS blocks 910 during a measurement interval to obtain five RSRP values that are subsequently averaged resulting in an averaged RSRP value. The five SS blocks 910 may carry a same cell ID. The averaged RSRP value can correspond to a beam on which the sequence of five SS blocks 910 are transmitted. The beam belongs to a cell identified by the cell ID carried in the respective SS blocks 910. In addition, the average RSRP value can reflect channel conditions at, for example, frequency locations 942-943. Inter-frequency RRM measurement with configuration of measurement gaps and BWP switching can be avoided.

In a second example, a wideband UE 952 operates covering the whole wideband carrier 901. In a first case, the wideband UE 952 uses any one of the transmissions 912-932 of the multiple SS blocks 910-930, and performs RRM measurement using the selected sequence of SS blocks in a way similar to the first example. In a second case, the wideband UE 952 uses multiple QCLed sequences of FDMed SS blocks, such as the transmissions 941 and 942, 942 and 943, 941 and 943, or the transmissions 941-943, and performs RRM measurement using the selected sequences of FDMed SS blocks. The multiple transmissions 941-943 may carry the same cell ID in the SS blocks 910-930 such that the respective SS blocks 910-930 can be distinguished from other SS blocks of neighbor cells. In addition, the SS blocks 910-930 of the multiple transmissions 912-932 may carry a same beam index corresponding to the beam used for the transmissions 912-932.

In the second case, as shown in FIG. 9, within a same measurement time period 961, there can be more REs carrying SSs distributed at multiple frequency locations 941-943 than using one transmission 912 of FDMed SS blocks 910. As a result, times and duration of the RRM measurement can be reduced while maintaining a same level of measurement accuracy. For example, compared with performing five times of measurement in the first example, three times of measurement in time domain may be performed assuming the multiple FDMed SS block transmissions are synchronized. Due to a decrease of the measurement times, power consumption of the UE 952 can be reduced.

In the above first and second cases, selection of one or more SS block transmissions for the RRM measurement can be determined by the UE 952, or can be configured by the BS 120 in different examples.

In a third example, a narrowband UE 953 operates on a BWP 903. The BWP 903 is not configured with a transmission of SS blocks. Accordingly, the UE 953 may use any one of the multiple FDMed SS block transmissions 912-932 to perform inter-frequency RRM measurement (e.g., RSRP). Measurement gaps can accordingly be configured and used.

In a fourth example, a wideband UE 954 operates on the BWP 903. The UE 934 may use one or multiple of the FDMed SS block transmissions 912-932 to perform inter-frequency RRM measurement. Measurement gaps can accordingly be configured and used.

To facilitate RRM measurement with the QCLed multiple FDMed SS block transmissions 912-932 within the wideband carrier 901, the BS 120 transmitting on the wideband carrier 901 may inform the UEs 951-954 the presence and parameters of the QCLed multiple FDMed SS block transmissions 912-932. For example, a configuration of FDMed SS block transmissions 921-932 may be signaled to the UEs 951-954 using dedicated RRC messages or broadcasting system information, or may be transmitted to the UEs 951-954 as a part of an RRM measurement configuration. The configuration may specify frequency locations and time domain locations (e.g., an offset with respect to an initial system frame number) of each FDMed SS block transmission 921-932. The configuration may further specify transmission configurations of each SS block burst set 911-931, such as transmission periods, actually transmitted SS blocks among candidate SS block positions, to-be-measured beam indexes if needed. The configuration may indicate that the respective FDMed SS block transmissions are QCLed or equivalent for RRM measurement.

In one example, anchor SS blocks are defined and utilized for RRM measurement. For example, an anchor SS block can be configured at a frequency location in each of a serving cell and neighbor cells. In other words, those anchor SS blocks can be transmitted by the serving cell and neighbor cells in a given frequency layer so that a UE can perform cell search to find potential cells identified by the anchor SS blocks and perform intra-frequency RRM measurement. For an initial access, some default anchor SS blocks in a default BWP can be assumed by the UE for cell access. For a UE in RRC connected mode or idle mode, a set of anchor SS blocks can be indicated by system information or dedicated RRC signaling for RRM measurement. Multiple sets of anchor SS blocks at multiple frequency locations may be configured in a wideband carrier, such that UEs may be distributed among those multiple frequency locations for load balancing when in RRC idle mode or RRC connected mode.

Accordingly, in FIG. 9 example, the QCLed multiple FDMed SS block transmissions 912-932 may be anchor SS blocks. In alternative examples, the ACLed multiple FDMed SS block transmissions 912-932 may include anchor SS blocks as well as non-anchor SS blocks (e.g., SS blocks configured in a serving cell but no corresponding SS blocks configured in neighbor cells at the same frequency location).

Figure 10:
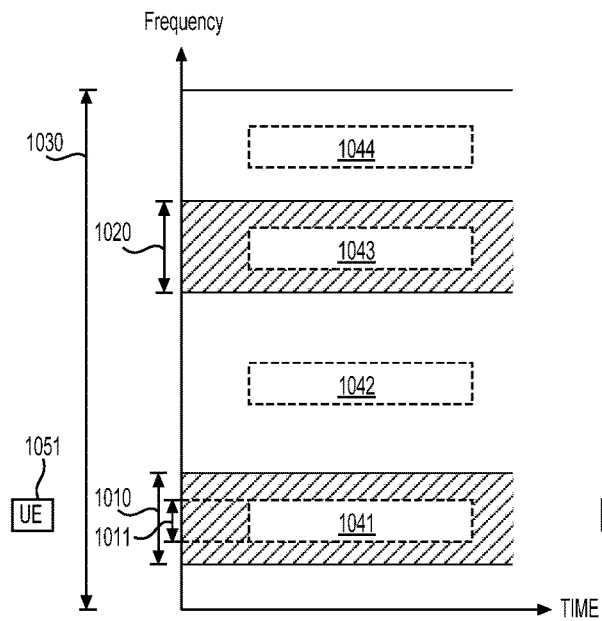
FIG. 10 shows a frequency domain measurement resource configuration example of received signal strength indicator (RSSI) measurement in a wideband carrier according to an embodiment of the disclosure.

FIG. 10 shows a frequency domain measurement resource configuration example of RSSI measurement in a wideband carrier 1030 according to an embodiment of the disclosure. For example, multiple QCLed FDMed SS block transmissions 1041-1044 are configured on the wideband carrier 1030. A UE 1051, which may be a narrowband UE or a wideband UE operating in narrowband mode, operates on an active BWP 1010. According to an RRM measurement configuration, the UE 1051 may perform RSRP measurement using the SS block transmission 1041. For example, multiple RSRP measurements may be obtained and averaged to obtain an RSRP value. The resulting RSRP value can be used to represent RSRP values at any frequency locations within the wideband carrier 1030 due to the QCLed SS block transmissions.

According to the RRM measurement configuration, the UE 1051 may perform RSSI measurement at a measurement bandwidth specified by the RRM measurement configuration. For example, a frequency location and a size of the measurement bandwidth may be specified to indicate frequency domain measurement resources. Time domain measurement resources can also be specified. The specified measurement bandwidths can be the same as or different from a measurement bandwidth (e.g., bandwidth 1011 of the SS block transmission 1041) for the above RSRP measurement, including overlapping the measurement bandwidth 1011 for the above RSRP measurement.

In a first example, the UE 1051 may be configured to perform RSRQ measurement on a BWP 1020 for supporting a BWP switching operation. For example, the UE 1051 may accordingly perform RSSI measurement to obtain an RSSI value corresponding to the BWP 1020. Multiple measurements may be performed at different time locations on OFDM symbols specified by the respective RRM measurement configuration. An averaged RSSI value can subsequently be obtained. Then, the UE 1051 may calculate an RSRQ based on the averaged RSSI value obtained on the measurement BWP 1020, and the RSRP value obtained on the measurement BWP 1010. To facilitate the RSSI measurement at the BWP 1020, measurement gaps may be configured corresponding to the frequency and time domain measurement resources specified by the RRM measurement configuration.

In a second example, the UE 1051 may be configured to perform RSRQ measurement on the whole wideband carrier 1030 for supporting a cell reselection or handover operation. Similarly, an RSSI value corresponding to the whole wideband carrier 1030 may be obtained based on the RRM measurement configuration. An RSRQ value may be calculated based on the RSSI value obtained on the wideband carrier 1030 and the RSRP value obtained on the BWP 1010.

In alternative examples, the RRM measurement configuration may not specify a measurement bandwidth for RSRQ/QSSI measurement. Accordingly, the RSSI measurement may be performed on a default measurement bandwidth, such as the BWP 1010 or the bandwidth 1011 occupied by SS blocks of the SS block transmission 1041.

Figure 11:
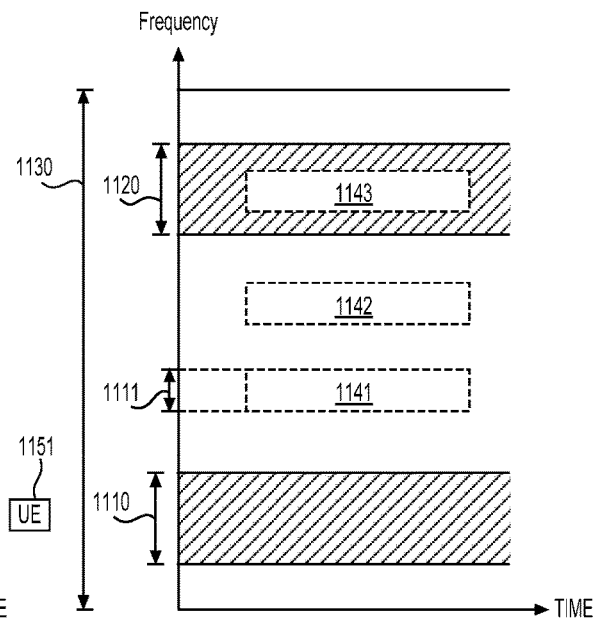
FIG. 11 shows a further frequency domain measurement resources configuration example of RSSI measurement in a wideband carrier according to an embodiment of the disclosure.

FIG. 11 shows a further frequency domain measurement resources configuration example of RSSI measurement in a wideband carrier 1130 according to an embodiment of the disclosure. Similar to FIG. 10, QCLed FDMed multiple SS block transmissions 1141-1143 are configured in a wideband carrier 1130. However, a UE 1151 operates in a BWP 1110 without SS block transmissions. Based on an RRM measurement configuration received from a serving BS, the UE 1151 may be configured to perform an RSRP measurement using any one of the SS block transmissions 1141-1143. For example, the RSRP measurement is performed using the SS block transmission 1141, and on a measurement bandwidth 1111 corresponding to the SS block transmission 1141.

According to the respective RRM measurement configuration, the UE 1151 may perform RSSI measurement at a configured measurement bandwidth, such as a BWP 1120 and/or the entirety of the wideband carrier 1130. The configured RSSI measurement bandwidth is different from the RSRP measurement bandwidth 1111.

In addition, for both the RSRP and RSSI measurement, RSRP measurement gaps and RSSI measurement gaps are independently configured. For example, respective frequency and time domain resources for the RSRP and RSSI measurement can be different with each other. Accordingly, the RSRP and RSSI measurement gaps may have different parameters. Or, in other words, the RSRP and RSSI measurement gaps are independent from each other. The parameters of a measurement gap configuration may include gap offset, gap duration, gap repetition period, and the like.

Figure 12:
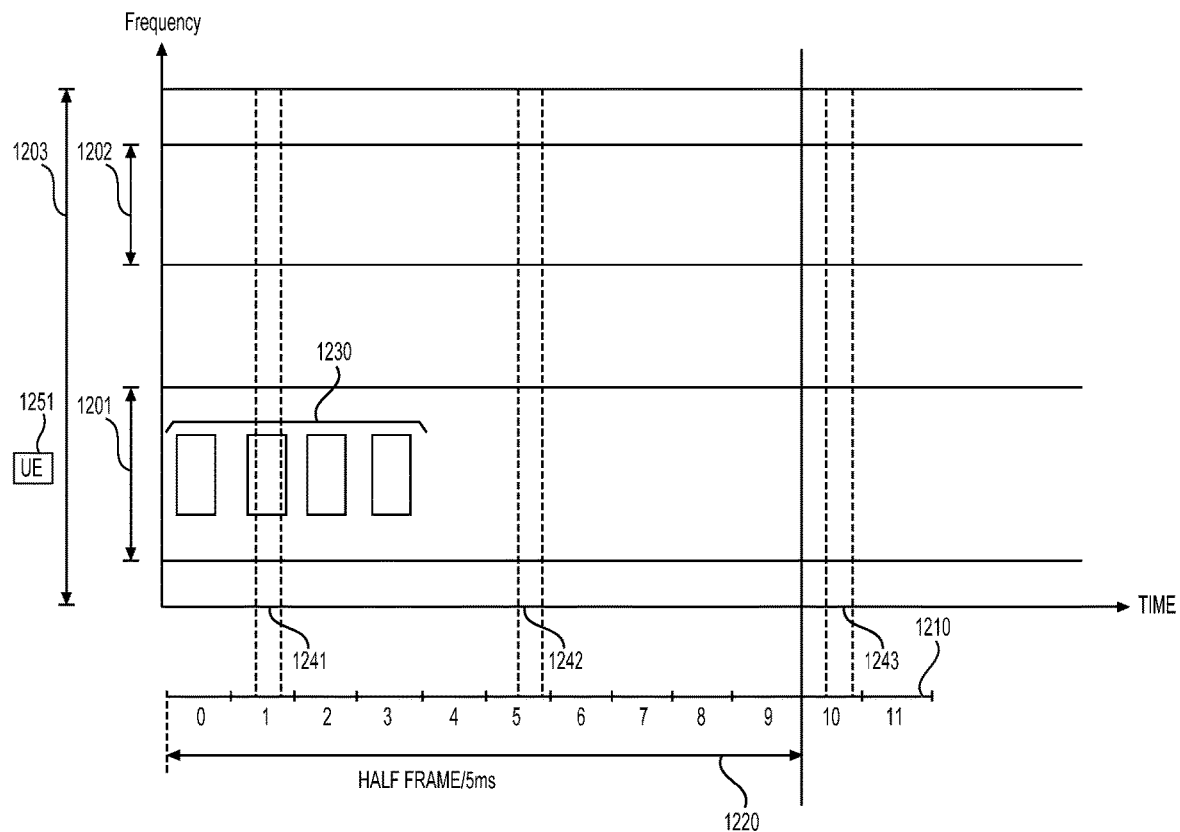
FIG. 12 shows a time domain measurement resource configuration example of RSSI measurement in a wideband carrier.

FIG. 12 shows a time domain measurement resource configuration example of RSSI measurement in a wideband carrier 1203. A sequence of slots 1210 indexed from 0 to 11 are shown in FIG. 12. Each slot may include a number of OFDM symbols (e.g., 14 OFDM symbols per slot). The first 10 slots indexed from 0 to 9 are within a 5 ms half frame 1220 that contains an SS block burst set 1230 in the first 4 slots. For example, each of the first 4 slots may include two SS blocks. Each SS block of the SS block burst set 1230 may be associated or transmitted from a Tx beam. The SS block burst set 1230 may be configured and indicated by a respective serving cell of a UE 1251 as QCLed with other SS block burst sets (not shown) within the wideband carrier. For example, SS blocks in different SS block burst set corresponding to a same Tx beam can be configured to be QCLed.

The UE 1251 operates on an active BWP 1201 that includes the SS block burst set 1230. According to an RRM configuration received from the serving cell, the UE 1251 may perform RSRP measurement using the QCLed SS block burst set 1230. For example, a set of RSRP values may be obtained for each SS block of the SS block burst set 1230 or each respective beam. The RSRP measurement may be repeatedly performed with a sequence of SS block burst sets including the SS block burst set 1230. An averaged RSRP value can be obtained for each respective Tx beam.

The UE 1251 may perform RSSI measurement according to the RRM measurement configuration. The RRM measurement configuration may specify frequency domain measurement resources, such as a BWP 1202. The RRM measurement configuration may also specify time domain measurement resources.

In a first example, the time domain measurement resources are configured to be a first set of OFDM symbols 1241 overlapping the SS block burst set 1230. As shown in FIGS. 7-8, a subset of OFDM symbols of a slot containing an SS block are occupied by SS block symbols, while the remaining OFDM symbols of the same slot are not occupied by SS block symbols. Accordingly, the first set of OFDM symbols 1241 may or may not overlap the respective SS block symbols in different RRM configurations. In addition, the first set of OFDM symbols 1241 may or may not be contiguous in time domain.

In a second example, the time domain measurement resources are configured to be a second set of OFDM symbols 1242 that are outside of the SS block burst set 1230 but within the respective half frame 1220. In a third example, the time domain measurement resources are configured to be a third set of OFDM symbols 1243 that are outside the respective half frame 1220.

In some examples, the time domain measurement resources for RSSI measurement are configured in a way that the set of OFDM symbols 1241, 1242, or 1243 correspond to a specific Tx beam. For example, the set of OFDM symbols 1241, 1242, or 1243 are transmitted from a specific beam. In this way, an RSSI value can be measured for the respective beam. Similarly, the time domain measurement resources for RSSi measurement may be configured for multiple beams, such that an RSSI value may be measured for each of the multiple beams. Further, those RSSI values of multiple beams may be averaged to obtain a cell level RSSI value.

While only one configured set of OFDM symbols 1241, 1242, or 1243 is shown in FIG. 12, the configured set of OFDM symbols 1241, 1242, or 1243 can repeat periodically. As a result, multiple times of RSSI measurement may be performed with respective repeatedly transmitted OFDM symbols.

Based on the RSRP measurement results obtained on the active BWP 1201 and the RSSI measurement results obtained on the BWP 1202, RSRQ measurement results can accordingly be calculated. Similarly, the above RSSI or RSSQ measurement can be performed on the entirety of the wideband carrier 1203 according to an RRM measurement configuration.

Figure 13:
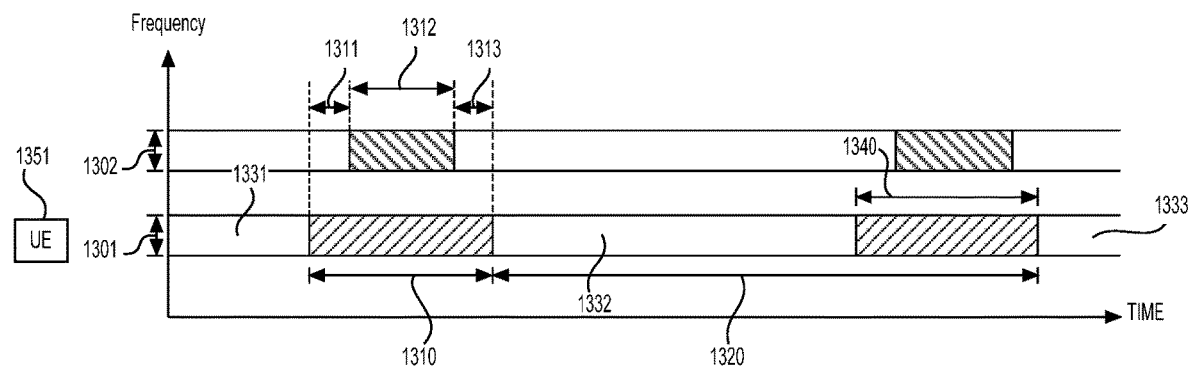
FIG. 13 shows a measurement gap configuration example of inter-frequency radio resource management (RRM) measurement according to an embodiment of the disclosure.

FIG. 13 shows a measurement gap configuration example of inter-frequency RRM measurement according to an embodiment of the disclosure. A UE 1351, which can be a narrowband UE or a wideband UE operating in narrowband mode, operates on an active BWP 1301, and performs inter-frequency RRM measurement (e.g., RSRP or RSSI) on a BWP 1302 according to an RRM measurement configuration. The RRM measurement configuration may include a measurement gap configuration specifying measurement gap parameters. The measurement gap configuration may specify a gap length (or gap duration) 1310, a gap repetition period 1320, and a gap offset (not shown) indicating a starting location of the measurement gaps.

During the RRM measurement process, the UE 1351 may receive data at intervals 1331, 1332, or 1333, however, cannot conduct data reception at measurement gaps 1310 or 1340. During the measurement gap 1310, at a first time period 1311, the UE 1351 performs RF tuning and switches to the BWP 1302. At a second time period 1312, the UE 1351 performs RRM measurement on the BWP 1302 without conducting data reception. At a third time period 1313, the UE 1351 tunes back to the active BWP 1301. A similar operation as in the measurement gap 1310 can be repeated at the measurement gap 1340.

Figure 14:
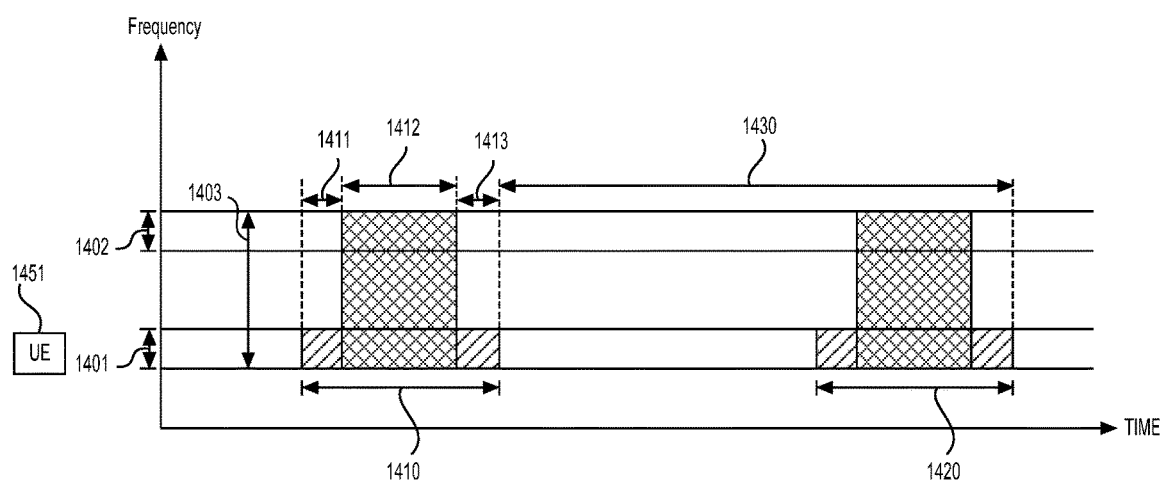
FIG. 14 shows a measurement gap configuration example for inter-frequency RRM measurement according to an embodiment of the disclosure.

FIG. 14 shows a measurement gap configuration example for inter-frequency RRM measurement according to an embodiment of the disclosure. A UE 1451 operates on an active BWP 1401, and is configured to perform inter-frequency RRM measurement (e.g., RSRP or RSSI) on a BWP 1402 according to an RRM measurement configuration. Instead of switching from the active BWP 1401 to the target BWP 1402 as conducted in FIG. 13 example, the UE 1451 may switch to a BWP 1403 that includes both the BWP 1401 and the BWP 1402. For example, the UE 1451 is capable of covering a measurement bandwidth including the two BWPs 1401 and 1402.

As an example, two similar measurement occasions 1410-1420 are shown in FIG. 14. In the first measurement occasion 1410, a first measurement gap 1411 is configured during which the UE 1451 performs RF tuning and switches to the BWP 1403. A measurement and reception interval 1412 follows the first measurement gap 1411 during which the UE 1451 performs RRM measurement and data reception simultaneously. A second measurement gap 1413 follows the measurement and reception interval 1412 during which the UE 1451 switches back to the BWP 1401. As shown, a total duration of measurement gaps 1411 and 1413 can be shorter than the measurement gap 1310 in FIG. 13. As a result, disturbing to data reception caused by inter-frequency RRM measurement is reduced.

Corresponding to the inter-frequency RRM measurement scheme shown in FIG. 14, the respective RRM measurement configuration can accordingly configure duration of each measurement occasion 1410 or 1420, a measurement occasion repetition period 1430, a first and second measurement gap 1411 and 1413 at a beginning and an end of each measurement occasion.

In some embodiments, CSI-RSs are used in place of SSs in SS blocks serving functions of synchronization or RRM measurement. Accordingly, the SS block based RSRP measurement processes or mechanisms in various examples described herein are also applicable to scenarios where CSI-RSs are used in place of SSs in SS blocks. For example, multiple sets of CSI-RSs can be configured to be associated with a Tx beam, and transmitted in multiple frequency locations in a wideband carrier. Those CSI-RSs can be configured to be QCLed or equivalent for RRM measurement. Thus, those QCLed FDMed multiple CSI-RS transmissions can be used for RRM measurement in a way similar to the QCLed FDMed multiple SS block transmissions. For example, RRM measurement results measured using one set of the CSI-RSs at a frequency location can be used to reflect channel conditions at other frequency locations within the wideband carrier. Similarly, anchor CSI-RS sets can be configured at a serving cell and neighbor cells to serve the functions of anchor SS blocks. The CSI-RSs can be used independently from SS blocks in a wideband carrier, or can be used in combination with SS blocks in a wideband carrier.

Figure 15:
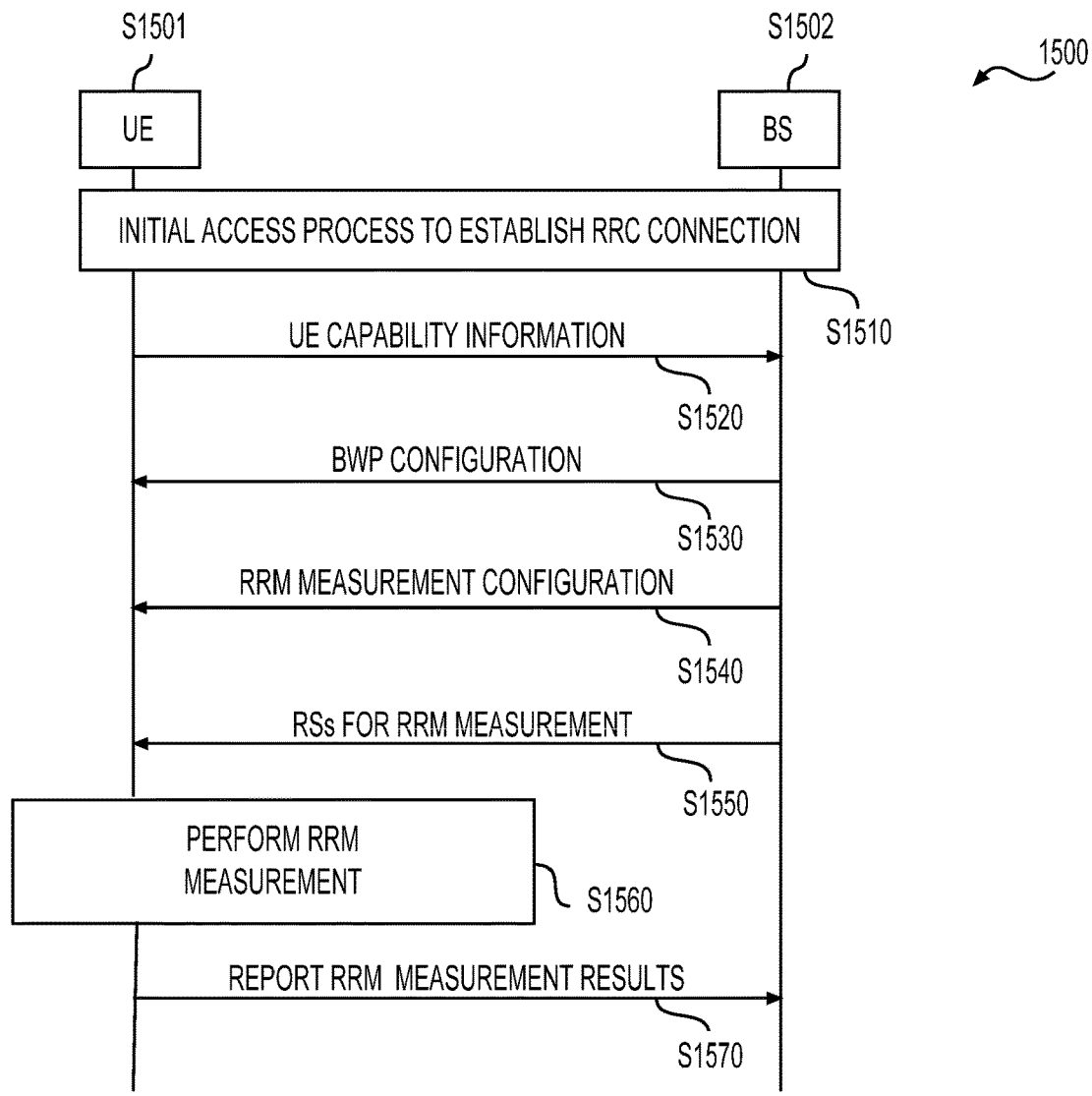
FIG. 15 shows an example RRM measurement process according to an embodiment of the disclosure.

FIG. 15 shows an example RRM measurement process 1500 according to an embodiment of the disclosure. During the process, a UE 1501 receives an RRM configuration from a BS 1502, and conducts RRM measurement accordingly on a wideband carrier, for example, having a bandwidth up to 400 MHz, or wider than 400 MHz.

At S1510, an initial access process is performed between the UE 1501 and the BS 1502. As a result, an RRC connection is established between the UE 1501 and the BS 1502. For example, the UE 1501 may perform the initial access process on a default BWP, or searches for a BWP that includes transmission of SS blocks.

At S1520, UE capability information is transmitted from the UE 1501 to the BS 1502. In various examples, the UE 1501 may have different capabilities in terms of maximum operating bandwidth, numerologies, CA capability, and the like.

At S1530, the BS 1502 transmits a BWP configuration to the UE 1501. The BWP configuration can be created according to the capability of the UE 1501. For example, a BWP having a suitable bandwidth, frequency location, numerology, and the like, is configured to the UE 1501. The configured BWP may be different from the BWP on which the UE 1501 performs the initial access process. For a wideband UE, the configured BWP can be the entirety or a portion of the wideband carrier. In addition, the BWP configuration may be created according to other additional factors, such as load balancing among different BWPs, subscription information associated with the UE 1501. In response to reception of the BWP configuration, the UE 1501 may switch to the BWP specified by the BWP configuration.

At S1540, an RRM measurement configuration is transmitted from the BS 1502 to the UE 1501. In one example, the measurement configuration is carried in a radio resource control (RRC) message. In one example, the measurement configuration is included in system information block (SIB) that is broadcasted from the BS 120.

In one example, the RRM measurement configuration indicates presence and parameters of multiple QCLed FDMed RS transmissions in the wideband carrier. The multiple QCLed FDMed RSs can be SSs of SS blocks or CSI-RSs. The RRM measurement configuration may indicate presence and parameters of multiple QCLed FDMed RS transmissions in the wideband carrier for multiple cells including a serving cell and some neighbor cells.

The RRM measurement configuration also indicates parameters for RRM measurement in the multiple cells. For example, the RRM measurement configuration indicates the RRM measurement results include RSRP, and/or RSSI/RSSQ measurements. For a wideband UE 1501, the RRM measurement configuration may indicate which one or more of the multiple QCLed FDMed RS transmissions are used for the RSRP measurement per each of the multiple cells. In alternative examples, the UE 1501 determines which one or more of the multiple QCLed FDMed RS transmissions are used for the RSRP measurement in different cells. For a narrow band UE 1501 operating on the configured BWP that does not contain SS blocks or CRI-RSs, the RRM measurement configuration may include a measurement gap configuration for inter-frequency RSRQ measurement in the serving cell or one of the neighbor cells.

For the RSSI/RSRQ measurement, the RRM measurement configuration may indicate a measurement bandwidth including frequency domain measurement resources. The indicated measurement bandwidth can be different from the configured BWP which the UE 1501 operates on. In addition, the RRM measurement configuration may indicate a measurement gap configuration for the RSSI/RSRQ measurement that can be different from the measurement gap configuration for the RSRP measurement.

Further for the RSSI/RSRQ measurement, the RRM measurement configuration may indicate time domain measurement resources (e.g., a set of OFDM symbols).

The measurement gap configurations specified by the RRM measurement configuration, either for RSRP measurement or RSSI measurement, can be based on one of the two inter-frequency schemes illustrated in FIGS. 13 and 14.

In various examples, the RRM measurement configuration may additionally include other information suitable for conducting the RRM measurement. For example, the measurement configuration may include the following parameters: measurement objects, reporting configurations, measurement identities, quantity configurations, measurement gaps, and the like.

For example, the measurement objects may provide a list of objects (cells) on which the UE shall perform the measurement. A measurement object can be associated with a carrier frequency. The reporting configurations may provide a list of reporting configurations. One or more reporting configurations may be specified for each cell. A reporting configuration may specify a reporting criterion that triggers the UE 1501 to send a measurement report. The triggers can either be periodical or a single event description. A reporting configuration may further specify a reporting format. For example, the format can include quantities per cell and per beam that the UE 1501 includes in the measurement report (e.g., RSRP/RSRQ/SINR) and other associated information such as a maximum number of cells and/or beams per cell to report.

At S1550, RSs for RRM measurement are transmitted from the BS 1502 to the UE 1501. For example, corresponding to the RRM measurement configuration transmitted at S1540, the QCLed FDMed RSs are transmitted. The S1550 may take place before or after the S1540. However, in alternative examples, the transmissions of the QCLed FDMed RSs on the wideband carrier in the serving cell or the neighbor cells may already take place before the UE 1501 accesses to the BS 1502 at S1510.

At S1560, the UE 1501 performs RRM measurement according to the RRM measurement configuration using the QCLed FDMed RS transmissions in the serving cell and the neighbor cells. For example, RSRP measurement results may be obtained using the RSs of the serving cell or neighbor cells by intra- or inter-frequency measurement. The respective RSRP measurement process in one cell may use one of the multiple QCLed FDMed RS transmissions with a longer measurement period, or, in contrast, more than one of the multiple QCLed FDMed RS transmissions with a shorter measurement period.

RSSI measurement results obtained at one or more measurement frequency locations can be used in combination with RSRP measurement results obtained at locations different from the RSSI measurement using RSs of different serving cell or neighbor cells to calculate cell specific RSRQ measurement results.

At S1570, the RRM measurement results (e.g., RSRP or RSRQ) can be reported from the UE 1501 to the BS 1502. For example, the reported measurement results may be carried in an RRC message. For example, when a reporting criterion is met, a measurement report can be triggered. The process 1500 may terminates thereafter.

Figure 16:
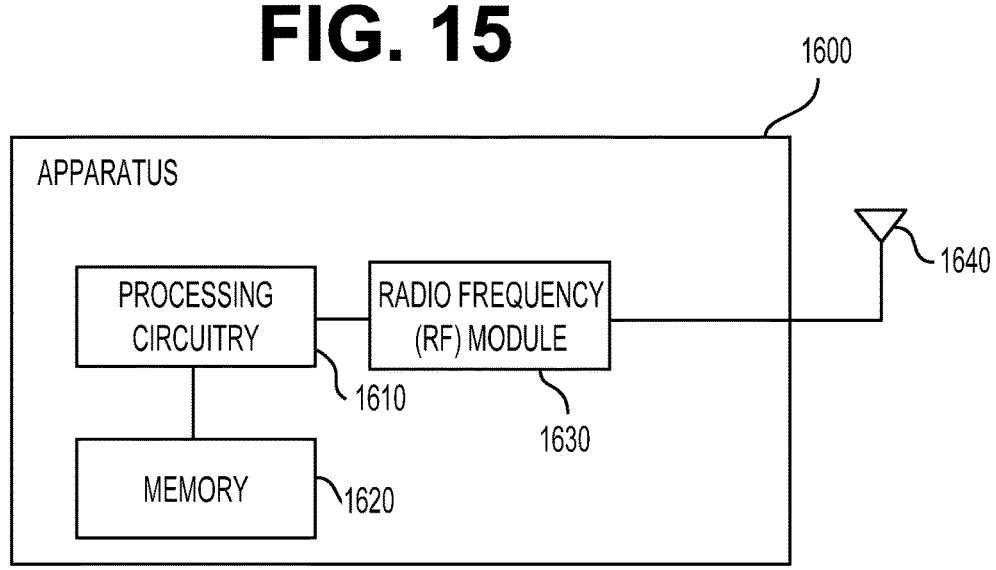
FIG. 16 shows an exemplary apparatus according to embodiments of the disclosure.

FIG. 16 shows an exemplary apparatus 1600 according to embodiments of the disclosure. The apparatus 1600 can be configured to perform various functions in accordance with one or more embodiments or examples described herein. Thus, the apparatus 1600 can provide means for implementation of techniques, processes, functions, components, systems described herein. For example, the apparatus 1600 can be used to implement functions of the UEs 110 and 1501 or the BS 120, 130 and 1502 in various embodiments and examples described herein. The apparatus 1600 can be a general purpose computer in some embodiments, and can be a device including specially designed circuits to implement various functions, components, or processes described herein in other embodiments. The apparatus 1600 can include processing circuitry 1610, a memory 1620, and a radio frequency (RF) module 1630.

In various examples, the processing circuitry 1610 can include circuitry configured to perform the functions and processes described herein in combination with software or without software. In various examples, the processing circuitry can be a digital signal processor (DSP), an application specific integrated circuit (ASIC), programmable logic devices (PLDs), field programmable gate arrays (FPGAs), digitally enhanced circuits, or comparable device or a combination thereof.

In some other examples, the processing circuitry 1610 can be a central processing unit (CPU) configured to execute program instructions to perform various functions and processes described herein. Accordingly, the memory 1620 can be configured to store program instructions. The processing circuitry 1610, when executing the program instructions, can perform the functions and processes. The memory 1620 can further store other programs or data, such as operating systems, application programs, and the like. The memory 1620 can include a read only memory (ROM), a random access memory (RAM), a flash memory, a solid state memory, a hard disk drive, an optical disk drive, and the like.

The RF module 1630 receives processed data signal from the processing circuitry 1610 and transmits the signal in a beam-formed wireless communication network via an antenna 1640, or vice versa. The RF module 1630 can include a digital to analog convertor (DAC), an analog to digital converter (ADC), a frequency up convertor, a frequency down converter, filters, and amplifiers for reception and transmission operations. The RF module 1640 can include multi-antenna circuitry (e.g., analog signal phase/amplitude control units) for beamforming operations. The antenna 1640 can include one or more antenna arrays.

The apparatus 1600 can optionally include other components, such as input and output devices, additional or signal processing circuitry, and the like. Accordingly, the apparatus 1600 may be capable of performing other additional functions, such as executing application programs, and processing alternative communication protocols.

While aspects of the present disclosure have been described in conjunction with the specific embodiments thereof that are proposed as examples, alternatives, modifications, and variations to the examples may be made.

Accordingly, embodiments as set forth herein are intended to be illustrative and not limiting. There are changes that may be made without departing from the scope of the claims set forth below.

The invention claimed is:

1. A method, comprising:
receiving, by processing circuitry of a user equipment (UE), a radio resource management (RRM) measurement configuration from a base station (BS) in a beamformed communication system, the RRM measurement configuration indicating presence of multiple quasi collocated (QCLed) frequency domain multiplexed (FDMed) reference signal (RS) transmissions in a carrier, the multiple QCLed FDMed RS transmissions including a first sequence of RS transmissions at a first frequency location and a second sequence of RS transmissions at a second frequency location, first RSs of the first sequence of RS transmissions and second RSs of the second sequence of RS transmission being equivalent in terms of RRM measurement; and
performing RRM measurement according to the received RRM measurement configuration using one or more of the multiple QCLed FDMed RS transmissions.

2. The method of claim 1, wherein the first and second RSs of the multiple QCLed FDMed RS transmissions include synchronization signals (SSs) of SS blocks, channel state information reference signals (CSI-RSs), or a combination of SSs of SS blocks and CSI-RSs.

3. The method of claim 1, further comprising:
performing reference signal received power (RSRP) measurement using more than one of the multiple QCLed FDMed RS transmissions, wherein received power on resource elements (REs) corresponding to the more than one of the QCLed FDMed RS transmissions is averaged to obtain an RSRP measurement.

4. The method of claim 1, further comprising:
operating on a bandwidth part (BWP) including a subset of the multiple QCLed FDMed RS transmissions; and
performing RSRP measurement using one or more of the subset of the multiple QCLed FDMed RS transmissions.

5. The method of claim 1, further comprising:
operating on a BWP of the carrier without the multiple QCLed FDMed RS transmissions; and
switching to a BWP including a subset of the multiple QCLed FDMed RS transmissions to perform inter-frequency RSRP measurement using the subset of the multiple QCLed FDMed RS transmissions.

6. The method of claim 1, further comprising:
operating on a BWP of the carrier containing a subset of the multiple QCLed FDMed RS transmissions;
performing RSRP measurement on the BWP using the subset of the multiple QCLed FDMed RS transmissions to obtain an RSRP measurement result;
performing received signal strength indicator (RSSI) measurement on a measurement bandwidth and/or a frequency location indicated by the RRM measurement configuration that is different from the BWP to obtain an RSSI measurement result; and
calculating a reference signal received quality (RSRQ) using the RSRP measurement result and the RSSI measurement result.

7. The method of claim 6, wherein the measurement bandwidth indicated by the RRM measurement configuration for the RSSI measurement overlaps or does not overlap the BWP.

8. The method of claim 1, further comprising:
operating on a BWP of the carrier without the multiple QCLed FDMed RS transmissions;
performing inter-frequency RSRP measurement on a first measurement bandwidth using a subset of the multiple QCLed FDMed RS transmissions to obtain an RSRP measurement;
performing inter-frequency RSSI measurement on a second measurement bandwidth that is different from the first measurement bandwidth to obtain an RSSI measurement; and
calculating an RSRQ measurement based on the RSRP measurement and the RSSI measurement.

9. The method of claim 1, further comprising:
performing inter-frequency RSRP measurement on a first measurement bandwidth using a subset of the multiple QCLed FDMed RS transmissions to obtain an RSRP measurement based on a first measurement gap configuration indicated by the RRM measurement configuration;
performing inter-frequency RSSI measurement on a second measurement bandwidth that is different from the first measurement bandwidth to obtain an RSSI measurement based on a second measurement gap configuration indicated by the RRM measurement configuration that is independent from the first measurement gap configuration; and
calculating an RSRQ measurement based on the RSRP measurement and the RSSI measurement.

10. The method of claim 1, further comprising:
performing RSRP measurement on a first measurement bandwidth using a subset of the multiple QCLed FDMed RS transmissions to obtain an RSRP measurement;
performing RSSI measurement on a second measurement bandwidth that is different from the first measurement bandwidth, and on time domain measurement resources indicated by the RRM measurement configuration to obtain an RSSI measurement, wherein the time domain measurement resources includes orthogonal frequency division multiplexing (OFDM) symbols that carry or does not carry RSs of the multiple QCLed FDMed RS transmissions;
calculating an RSRQ measurement based on the RSRP measurement and the RSSI measurement.

11. The method of claim 1, further comprising:
operating on a first BWP of the carrier;
performing a radio frequency (RF) tuning during a first measurement gap to cover a second BWP overlapping the first BWP and a measurement bandwidth;
performing RRM measurement on the measurement bandwidth while performing data reception on the first BWP; and
performing an RF tuning during a second measurement gap to switch back to the first BWP.

12. The method of claim 11, wherein the RRM measurement on the measurement bandwidth includes RSRP and/or RSSI measurement.

13. A method, comprising:
transmitting, by processing circuitry of a base station, a radio resource management (RRM) measurement configuration to a user equipment (UE) in a beamformed communication system, the RRM measurement configuration indicating presence of multiple quasi collocated (QCLed) frequency domain multiplexed (FDMed) reference signal (RS) transmissions in a carrier transmitted from the base station, the multiple QCLed FDMed RS transmissions including a first sequence of RS transmissions at a first frequency location and a second sequence of RS transmissions at a second frequency location, first RSs of the first sequence of RS transmissions and second RSs of the second sequence of RS transmission being equivalent in terms of RRM measurement; and receiving measurement results obtained according to the RRM measurement configuration from the UE.

14. The method of claim 13, wherein the first and second RSs of the multiple QCLed FDMed RS transmissions include synchronization signals (SSs) of SS blocks, channel state information reference signals (CSI-RSs), or a combination of SSs of SS blocks and CSI-RSs.

15. The method of claim 13, wherein the RRM measurement configuration indicates frequency locations and periods of the multiple QCLed FDMed RS transmissions.

16. The method of claim 13, further comprising:
transmitting a bandwidth part (BWP) configuration to the UE indicating an active BWP including at least one of the multiple QCLed FDMed RS transmissions; and
transmitting the RRM measurement configuration indicating a measurement bandwidth for received signal strength indicator (RSSI) measurement that is different from the active BWP configured to the UE.

17. The method of claim 13, further comprising:
transmitting a BWP configuration to the UE indicating an active BWP without the multiple QCLed FDMed RS transmissions; and
transmitting the RRM measurement configuration indicating a first measurement bandwidth and a first measurement gap configuration for reference signal received power (RSRP) measurement on the first measurement bandwidth that includes a subset of the multiple QCLed FDMed RS transmissions, and a second measurement bandwidth and second measurement gap configuration for RSSI measurement on the second measurement bandwidth,
wherein the second measurement bandwidth is different from the first measurement bandwidth, and the second measurement configuration is independent from the first measurement configuration.

18. The method of claim 13, further comprising:
transmitting the RRM measurement configuration indicating:

a first measurement bandwidth for RSRP measurement including a subset of the multiple QCLed FDMed RS transmissions,
a second measurement bandwidth for RSRQ measurement that is different from the first measurement bandwidth, and
time domain resources for RSSI measurement including a set of OFDM symbols that carries or does not carry RSs of the multiple QCLed FDMed RS transmissions.

19. The method of claim 13, further comprising:
transmitting a BWP configuration indicating an active BWP to the UE;
transmitting the RRM measurement configuration indicating a measurement gap configuration specifying a first measurement gap and a second measurement gap at a beginning and an end, respectively, of a measurement occasion, and a repetition period of the measurement occasion; and
transmitting data during an interval between the first and second measurement gaps on the active BWP.

20. A user equipment (UE), comprising processing circuitry configured to:
receive a radio resource management (RRM) measurement configuration from a base station (BS) in a beamformed communication system, the RRM measurement configuration indicating presence of multiple quasi collocated (QCLed) frequency domain multiplexed (FDMed) reference signal (RS) transmissions in a carrier, the multiple QCLed FDMed RS transmissions including a first sequence of RS transmissions at a first frequency location and a second sequence of RS transmissions at a second frequency location, first RSs of the first sequence of RS transmissions and second RSs of the second sequence of RS transmission being equivalent in terms of RRM measurement; and
perform RRM measurement according to the received RRM measurement configuration using one or more of the multiple QCLed FDMed RS transmissions.

21. The method of claim 1, wherein an RRM measurement performed at the first frequency location using one or more first RSs is used to indicate a channel condition at the second frequency location.

* * * * *